United States Patent [19]

Stricklen

[11] Patent Number: 4,939,217

[45] Date of Patent: Jul. 3, 1990

[54] PROCESS FOR PRODUCING POLYOLEFINS AND POLYOLEFIN CATALYSTS

[75] Inventor: Phil M. Stricklen, Bartlesville, Okla.

[73] Assignee: Phillips Petroleum Company, Bartlesville, Okla.

[21] Appl. No.: 35,951

[22] Filed: Apr. 3, 1987

[51] Int. Cl.$^5$ ............................ C08F 4/66; C08F 10/00
[52] U.S. Cl. ..................................... 526/114; 502/113; 526/116; 526/119; 526/160; 526/905; 526/352
[58] Field of Search ........................ 526/114, 116, 119

[56] References Cited

U.S. PATENT DOCUMENTS

| | | | |
|---|---|---|---|
| 2,827,446 | 3/1958 | Breslow | 260/94.9 |
| 3,462,406 | 8/1969 | Natta et al. | 526/138 |
| 3,472,829 | 10/1969 | Claybaugh et al. | 526/906 |
| 3,678,025 | 7/1972 | Birrell | 260/94.9 E |
| 4,109,071 | 8/1978 | Berger et al. | 526/114 |
| 4,404,344 | 9/1983 | Sinn et al. | 526/160 |
| 4,530,914 | 7/1985 | Ewen et al. | 502/113 |
| 4,542,199 | 9/1985 | Kaminsky et al. | 526/160 |
| 4,752,597 | 6/1988 | Turner | 526/160 |

FOREIGN PATENT DOCUMENTS

| | | |
|---|---|---|
| 0128046 | 12/1984 | European Pat. Off. |
| 2608863 | 8/1977 | Fed. Rep. of Germany |
| 2608933 | 8/1977 | Fed. Rep. of Germany |
| 3007433 | 3/1981 | Fed. Rep. of Germany |

OTHER PUBLICATIONS

J. Cihlar et al. Makromol. Chem. 182, 1127–1134 (1981).
Herwig et al., Polymer Bulletin 9, 464–469 (1983).
Kaminsky et al., Makromol. Chem. 5, 225–228 (1984).

*Primary Examiner*—Edward J. Smith
*Attorney, Agent, or Firm*—Phillips Petroleum Company

[57] ABSTRACT

A process for producing a polyolefin having a multimodal molecular weight distribution wherein the polymerization is conducted in the presence of hydrogen and a catalyst system containing aluminoxane and at least two different metallocenes each having different olefin polymerization termination rate constants in the presence of hydrogen, and the process of producing the catalyst system.

27 Claims, 4 Drawing Sheets

SEC CURVES OF POLYMERS PREPARED USING Zr/ALUMINOXANE CATALYST.
A - WITH 4 MOLE% HYDROGEN IN THE REACTOR;
B - WITH NO HYDROGEN IN THE REACTOR.

LOG OF MOLECULAR WEIGHT

SEC CURVES OF POLYMERS PREPARED USING Ti/ALUMINOXANE CATALYST.
A - WITH 4 MOLE% HYDROGEN IN THE REACTOR;
B - WITH NO HYDROGEN IN THE REACTOR.

LOG OF MOLECULAR WEIGHT

SEC CURVES FOR TWO POLYMERS PRODUCED WITH CATALYSTS HAVING
DIFFERENT Zr/Ti RATIOS WITH 4 MOLE % HYDROGEN IN THE REACTOR
A - Zr/Ti=5, B - Zr/Ti=16.

LOG OF MOLECULAR WEIGHT

EFFECTS OF HYDROGEN CONCENTRATION. SEC CURVES OF POLYMERS PRODUCED WITH A CATALYST HAVING Zr/Ti RATIO OF 16 AT DIFFERENT HYDROGEN LEVELS. I) NO HYDROGEN, II) 2 MOLE% HYDROGEN, III) 4 MOLE% HYDROGEN, IV) 6 MOLE% HYDROGEN, AND V) 8 MOLE% HYDROGEN.

PROCESS FOR PRODUCING POLYOLEFINS AND POLYOLEFIN CATALYSTS

FIELD OF THE INVENTION

This invention relates to a method for preparing polyolefins having a multimodal molecular weight distribution. This invention also relates to altering the multimodal molecular weight distribution of polyolefins. This invention in another aspect relates to the preparation of a polyolefin polymerization catalyst support. This invention further relates to a method for preparing olefin polymerization catalysts.

BACKGROUND OF THE INVENTION

Polyolefins having a multimodal molecular weight distribution (MWD), such as polyethylene, can be made into articles by extrusion molding, thermoforming, rotational molding, etc. and have advantages over typical polyolefins lacking the multimodal MWD. Polyolefins having a multimodal MWD process more easily, i.e., they can be processed at a faster throughput rate with lower energy requirements and at the same time such polymers evidence reduced melt flow perturbations and are preferred due to improved properties for applications such as high strength films.

There are several known methods of producing polyolefins having a multimodal MWD; however, each method has its own disadvantages. Polyolefins having a multimodal MWD can be made by employing two distinct and separate catalysts in the same reactor each producing a polyolefin having a different MWD; however, catalyst feed rate is difficult to control and the polymer particles produced are not uniform in size, thus, segregation of the polymer during storage and transfer can produce non-homogeneous products. A polyolefin having a bimodal MWD can also be made by sequential polymerization in two separate reactors or blending polymers of different MWD during processing; however, both of these methods increase capital cost.

U.S. Pat. No. 4,530,914, incorporated herein by reference, discloses a method of producing polyethylene having a broad molecular weight distribution and/or a multimodal MWD. The polyethylenes are obtained directly from a single polymerization process in the presence of a catalyst system comprising two or more metallocenes each having different propagation and termination rate constants, and aluminoxane.

There are certain limits to the known methods of preparing bimodal molecular weight distribution or multimodal molecular weight distribution polyolefins. At certain ratios, and in certain polymerization processes, even catalysts having two different metallocenes on aluminoxane produce polyolefins having monomodal molecular weight distributions. Even under ideal conditions if the bimodal molecular weight distribution of the polymer needs to be changed, a new catalyst needs to be made at different metallocene ratios.

It is known to prepare aluminoxane supports by saturating an organic solvent with water and reacting it with an aluminum alkyl compound. In this process, however, the water molecules tend to cluster and can over-hydrolyze the aluminum alkyl compound, forming alumina which has to be separated; wasting reactant and increasing processing steps. It is also known to produce aluminoxane by using the water of crystallization of inorganic salts such as $CuSO_4 \cdot 5H_2O$ and $Al_2(SO_4)_3 \cdot 6H_2O$, to introduce water in a monomolecular form to produce the aluminoxane. In this process, however, the remaining inorganic salt must be removed from the sometimes viscous reaction medium; increasing cost and processing steps. In these known processes of preparing aluminoxane it is not disclosed to have the metallocenes present during the reaction with water.

It is an object of the present invention to produce polyolefins having a multimodal molecular weight distribution. It is an object of the present invention to produce polyolefins having varied multimodal molecular weight distributions without altering the metallocene ratio or changing catalysts. It is a further object of the present invention to produce an improved process of making polyolefins having a multimodal molecular weight distribution. It is an object of the present invention to provide an improved process of making aluminoxane support. It is a further object of the present invention to provide an improved process of producing solid dual metal polymerization catalysts. It is also an object of the present invention to provide a process whereby a polyolefin having a varied multimodal molecular weight distribution can be produced.

SUMMARY OF THE INVENTION

I have discovered a novel process for producing polyolefins having a multimodal molecular weight distribution. These polyolefins are prepared by contacting at least one olefin in a polymerization zone under polymerization conditions in the presence of an amount of hydrogen and a catalyst system having at least two different cyclopentadienyl metallocenes on an aluminoxane support wherein each metallocene has a different termination rate constant of olefin polymerization in the presence of hydrogen.

I have also discovered a novel method of preparing a catalyst system as used in the above process. I have discovered a simple, but yet effective process of preparing the aluminoxane support or the total catalyst. The process of preparing the aluminoxane support according to the process of my invention comprises bubbling a wet inert gas through a mixture of hydrocarbon solvent and an amount of an aluminum alkyl compound under conditions sufficient to produce an aluminoxane support from the aluminum alkyl compound. The catalyst is prepared by adding at least two different metallocenes to the aluminoxane support as produced above or by preparing the aluminoxane support as above in the presence of the at least two different metallocenes.

DESCRIPTION OF THE DRAWINGS

As shown in FIG. 4 the broadening of the multimodal or bimodal MWD is not only affected by the ratio of metals but is also affected by the concentration of hydrogen in the reactor. The zirconium/titanium ratio in the aluminoxane catalyst is 16 for all curves I-V; however, the hydrogen concentration is varied from 0 up to 8 mole percent. Catalyst activities are not strongly affected by hydrogen; however, the presence of hydrogen during the slurry phase polymerization does produce a polymer having a broad, multimodal or bimodal MWD. SEC curve I shows that a polymer is produced having a narrow MWD when no hydrogen is present during polymerization. Comparing this SEC curve with SEC curve II shows that a broad shoulder on the low Mw side of the SEC curve appears when only 2 mole percent hydrogen is present during polymerization. This is due to the low molecular weight polyethylene produced by the zirconium component of the catalyst in the presence of hydrogen. The presence of 4 mole percent hydrogen (SEC curve III) during the polymerization of ethylene produces a more distinct multimodal appearance in the SEC curve. The presence of 6 mole percent hydrogen (SEC curve IV) during the polymerization of ethylene shows a very symmetrical SEC curve of a polyethylene having a multimodal MWD. With the addition of 8 mole percent hydrogen (SEC curve V) the MWD is dominated by the low Mw component; however, the polyethylene produced still has a multimodal MWD.

DETAILED DESCRIPTION OF THE INVENTION

Figure 1:
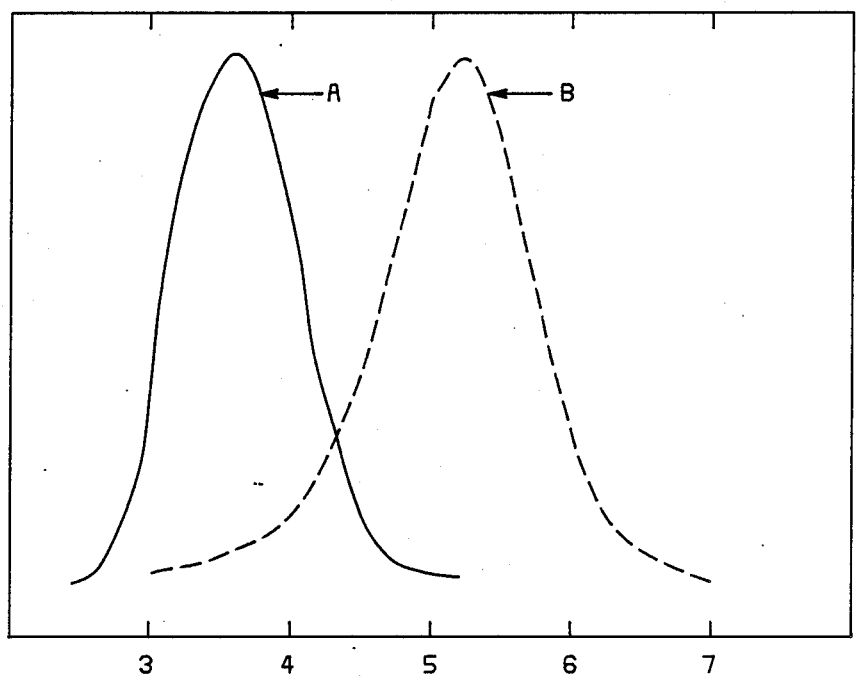
FIGS. 1 and 2 show the size exclusion chromatograph (SEC) curves of the polymers prepared with a single metallocene aluminoxane catalyst, either zirconium or titanium. These curves show the effect of the presence of hydrogen on the olefin polymerization termination rate constants of the zirconium and titanium catalysts. The change in the polymer molecular weight due to the chain transfer to hydrogen is dramatic for the zirconium catalyst, but insignificant for the titanium catalyst. The weight average molecular weight (Mw) of the polymer produced with the zirconium catalyst (FIG. 1) changes from 206,000 when no hydrogen is used to 6840 when 4 mole percent hydrogen per 96 mole percent ethylene is added to the polymerization reactor. The change of Mw for the polymers produced with and without hydrogen using the titanium catalyst is much smaller, going from 393,000 to 348,000.

In accordance with my invention, polyolefins having a multimodal or at least bimodal molecular weight distribution are prepared by contacting in a reaction mixture under polymerization conditions at least one olefin, an amount of hydrogen, and a catalyst system comprising an amount of an aluminoxane and an amount of at least two different metallocenes selected from mono, di, and tri-cyclopentadienyls and substituted cyclopentadienyls of a transition metal each having different termination rate constants of olefin polymerization in the presence of hydrogen, wherein the amount of hydrogen, metallocenes, and aluminoxane is sufficient to produce a polyolefin having a multimodal molecular weight distribution such as, for example, bimodal molecular weight distribution (MWD).

According to my invention it is important that the at least two different metallocenes each have different olefin polymerization termination rate constants in the presence of hydrogen. Dual metal on aluminoxane catalysts of the present invention such as, for example, Zr/Ti on aluminoxane produce a polyolefin such as, for example, polyethylene in the absence of hydrogen having a high molecular weight and a narrow molecular weight distribution. This is particularly true even at most ratios of zirconium to titanium in slurry phase polymerization processes.

The presence of hydrogen during polymerization with the defined catalyst results in producing a polymer having a broad bimodal molecular weight distribution. The presence of hydrogen in the polymerization reactor during polymerization affects, to a greater extent, one metal of the dual metal aluminoxane catalyst (such as, for example, zirconium) and active centers of that metal produce lower molecular weight polymer whereas the other metal (such as, for example, titanium), is not as affected and the active centers of that metal still produce a high molecular weight polymer.

In accordance with my invention the broadness of the molecular weight distribution and the average molecular weight can be controlled by varying the transition metals in the catalyst, and the hydrogen concentration in the polymerization reactor. In my invention it is important that some amount of hydrogen be present during polymerization and that the catalyst particles contain both metals so that after polymerization each polymer particle will contain both low and high molecular weight molecules. A polymer produced according to the present invention is more processable and prevents particle size segregation of the polymer particles, having different MWD, during transfer and storage.

According to my invention it is preferred that the polymerization process be conducted under slurry phase polymerization conditions. It is preferred that the slurry phase polymerization conditions comprise a temperature of about 80° to 110° C. and a pressure of about 250 to 700 psia, for a time between about 1 minute to 6 hours. It is more preferred that the slurry phase polymerization be conducted at a pressure of about 400 to 600 psia for a time between about 10 minutes and 2 hours. A pressure between about 500 to 565 psia for a time between about 20 minutes and 1 hour is most preferred.

According to my invention it is preferred that the relative amounts of hydrogen and olefin introduced into the polymerization reactor be within the range of about 0.001 to 15 mole percent hydrogen and 99.999 to 85 mole percent olefin based on total hydrogen and olefin present, preferably about 1 to 10 mole percent hydrogen and 99 to 90 mole percent olefin. The amounts of about 4 mole percent hydrogen and 96 mole percent olefin being most preferred.

In the process of the present invention it is preferred that the weight ratio of diluent to catalyst be within the range of about 500:1 to 1,000,000:1, preferably about 1,000:1 to 100,000:1, and more preferably about 2,000:1 to 10,000:1.

It is preferred that the polymerization reaction be run in a diluent at a temperature at which the polymer remains a solid in the diluent. Diluents include, for examples, isobutane, n-hexane, n-heptane, and methylcyclohexane, etc. The preferred diluent is isobutane.

The monomer that is used in the process of the present invention to produce a polyolefin of bimodal molecular weight distribution in which each polymer particle contains both high and low molecular weight polymer molecules is preferably selected from mono-1-olefins (alpha olefins), preferably mono-1-olefins having from 2 to 10 carbon atoms including, for example, 4 methyl-1-pentene. More preferably these mono-1-olefins are selected from the group consisting of ethylene, propylene, and mixtures thereof; ethylene being the most preferred.

It is also preferred that the polymer produced according to the present invention be a high density polyethylene homopolymer having a density of at least about 0.95 determined according to ASTM standard 2839-69, preferably a density of about 0.95 to 0.97.

It is possible but less preferred to make low density polyethylene by the process of introducing a relatively large amount of higher olefin such as 1-hexene, 1-butane, or 1-octane into the polymerization reactor in the presence of a small amount of hydrogen and the catalyst of the present invention. This process would produce a low density polyethylene having a bimodal molecular weight distribution; however, the separation between the high and low molecular weight peaks would not be as pronounced as when there is a larger amount of hydrogen present in the absence of the higher olefin. If, however, there were a large amount of hydrogen (such as about 1 to 10 mole percent) present with the higher olefin and the catalyst of the present invention then low density polyethylene is generally not produced.

The catalyst used in the above process for producing polyolefins having multimodal molecular weight distribution can be made by any known method so long as at least two different metallocenes are present on the aluminoxane support and that these metallocenes have different polymerization termination rate constants in the presence of hydrogen with respect to each other. Known processes of producing these types of catalysts are disclosed in U.S. Pat. No. 4,530,914 the disclosure of which is incorporated herein by reference.

The aluminoxanes, which are the support and cocatalysts for the metallocenes of the catalyst of the present invention are known in the art and are polymeric aluminum compounds which can be represented by the general formula $(R-Al-O)_n$ which is a cyclic compound and $R(R-Al-O-)_n AlR_2$, which is a linear compound. In the general formulae, R is a $C_1$–$C_{10}$, preferably a $C_1$–$C_s$ alkyl group such as, for example, methyl, ethyl, propyl, butyl, and pentyl, etc., and n is preferably an integer of 1 to about 20. Most preferably, R is methyl.

It is known to prepare aluminoxanes by saturating an organic solvent with water which then reacts with the aluminum alkyl and forms aluminoxane. However, the water molecules in this process tend to cluster, which can over-hydrolyze the alkyl aluminum, forming inactive $Al_2O_3$ thereby wasting reactants and increasing processing steps to remove the $Al_2O_3$. Another process of forming aluminoxane is by using the water of crystallization of inorganic salts such as hydrated copper sulfate in a hydrocarbon solution. The resulting dehydrated salt leaves a finely divided material which must be removed from the sometimes viscous reaction medium. The particle size of the salt controls the extent and rate of the dehydration reaction and can vary from batch to batch.

A preferred method of adding water to hydrolyze the aluminum alkyl is to bubble an inert gas, such as nitrogen, saturated with water through a solution of the aluminum alkyl. The amount of water and the rate at which it is added can be controlled by the water temperature (water vapor pressure) and the inert gas flow rate. The water is well dispersed, minimizing the formation of alumina ($Al_2O_3$). In this preferred process of making the catalyst of the present invention there are fewer steps and no by-products produced that need to be removed before the aluminoxane can be used and aluminum alkyl reactant is not wasted in the formation of alumina.

According to the preferred process of the present invention at least two metallocenes are contacted with a soluble aluminoxane, prepared according to the above process, to form a catalyst. It is also possible, and even more preferred, to react a reactant mixture of at least two metallocenes with the aluminum alkyl in a hydrocarbon solvent followed by bubbling a wet inert gas through the mixture to hydrolyze the aluminum alkyl thereby producing a multimetal on aluminoxane polymerization catalyst.

If the hydrocarbon is an aliphatic hydrocarbon, the aluminoxane as it is formed, from hydrolyzing the aluminum alkyl, will precipitate. It is preferred that if the aluminoxane is prepared prior to the addition of the metallocenes that the hydrocarbon solvent be aromatic so that the aluminoxane will remain in solution until after reacting with the metallocenes. If, however, the metallocenes are present with the aluminum alkyl prior to the formation of aluminoxane it is preferred that the hydrocarbon solvent be an aliphatic hydrocarbon so that upon formation of the aluminoxane, the catalyst precipitates.

The most preferred process of preparing the catalyst of the present invention essentially comprises: bubbling a wet inert gas through a mixture of (a) an aliphatic hydrocarbon solvent, (b) an amount of an aluminum compound of the formula $AlR_s$ wherein each R can be the same or different and is selected from alkyl groups having from 1 to 10 carbon atoms, and tri-cyclopentadienyls and substituted cyclopentadienyls of a transition metal each having different termination rate constants of olefin polymerization in the presence of hydrogen, thereby producing a solid dual metal on aluminoxane polymerization catalyst wherein the temperature and pressure of said mixture is sufficient to maintain said hydrocarbon solvent in liquid phase and produce said catalyst.

In the process of preparing the catalyst of the present invention it is preferred, but not required, that the inert gas be saturated with water. When the particular inert gas is saturated with water it is easier to calculate how much water has reacted with the aluminum alkyl. It is important to know how much water has reacted so that the aluminum alkyl is not converted to alumina by having too much water present.

According to the present invention it is preferred that the inert gas be bubbled through the water at a temperature, pressure, and rate to essentially saturate the inert gas with water which is followed by bubbling this wet inert gas through the hydrocarbon solvent, containing the reactants, at a temperature, pressure, and rate sufficient to essentially react all of the water in the inert gas with the aluminum alkyl compound. It is preferred that the molar ratio of water to aluminum alkyl that is bubbled through the hydrocarbon solvent in the inert gas be within the range of about 0.01:1 to 1.4:1, more preferably within the range of about 0.5:1 to 1:1.

According to my invention, the inert gas can be any non-reactive gas, such as nitrogen and nobel gases in group VIII of the Periodic Table of the elements, nitrogen being preferred due to its availability.

According to my invention, it is preferred that the weight ratio of aluminum alkyl to hydrocarbon be within the range of about 1:1 to 1:100, preferably about 1:2 to about 1:50, and more preferably about 1:4 to 1:10.

According to my invention, it is preferred that the hydrocarbon be selected from normal and cyclo alkanes having from 5 to 10 carbon atoms, n-hexane being preferred.

According to my invention, it is preferred that the aluminum alkyl (AlRs) be an aluminum alkyl wherein each R is selected from alkyl groups having 1 to 5 carbon atoms. The most preferred aluminum alkyl being trimethyl aluminum.

According to my invention, it is preferred that the aluminoxane support/cocatalyst make up the majority of the catalyst. Preferably the weight ratio of total metallocenes to aluminoxane is within the range of about 1:5 to $1:10^8$, preferably about 1:10 to $1:10^5$, and more preferably about 1:20 to $1:10^3$. Based on productivity of grams of polymer/grams total catalyst, it is preferred that the catalyst consist of transition metal metallocenes between about 3 to 6 weight percent based on the total weight of the catalyst.

The catalysts produced according to the present invention are heterogeneous catalysts. Heterogeneous catalysts are generally preferred for the production of polymers, such as, for example, polyethylene in commercial productions. Isolating the active centers on a support, in heterogeneous catalysts, eliminates deactivation reactions between the active centers, which can occur with homogeneous catalysts. In addition, the size and size distribution of the polymer particles can be controlled by the proper preparation of the catalyst support.

According to my invention, it is important that the metallocenes, employed in the catalyst have different termination rate constants with respect to olefin polymerization in the presence of hydrogen. Such rate constants can be determined by one of ordinary skill in the art. The metallocenes are the organometallic coordination compound which are the mono, di, and tri-cyclopentadienyls and their derivatives of transition metals of Groups IVB, VB, and VIB metals of the Periodic Table. The more desirable metallocenes employed in accordance with this invention are represented by the general formula $(C_5R'm)pR''s(C_5R'm)MeQ_{3-p}$ and $R''s(C_5R'm)_2MeQ'$ wherein $(C_5R'm)$ is cyclopentadienyl or substituted cyclopentadienyl, each R can be the same or different and is selected from hydrogen or a hydrocarbyl radical selected from alkyl, alkenyl, aryl, alkylaryl, or arylalkyl radicals having from 1 to 20 carbon atoms or two adjacent carbon atoms are joined together to form a $C_4$-$C_6$ ring, R'' is a $C_1$-$C_4$ alkylene radical, a dialkyl germanium or silicone or alkyl phosphine or amine radical bridging two $(C_5R'm)$ rings, Q is a hydrocarbon radical such as aryl, alkyl, alkenyl, alkylaryl, or arylalkyl radicals having from 1-20 carbon atoms or halogen and can be the same or different, Q' is an alkylidene radical having from 1 to about 20 carbon atoms, Me is a transition metal from Group IVB, VB, or VIB metals of the Periodic Table of the elements, s is 0 or 1, p is 0, 1 or 2, when p is 0, s is 0; m is 4 when s is 1 and m is 5 when s is 0.

It is preferred that the metallocenes be cyclopentadienyls of zirconium and titanium. Cyclopentadienyl complexes of zirconium and titanium form very effective and active catalysts with aluminoxanes. The dimethyl-dicyclopentadienyl complexes of zirconium and titanium are more preferred due to their ease of preparation and the fact that they are free from chlorides, making the catalyst system totally halogen free. The dimethyl-dicyclopentadienyl complexes of zirconium and titanium also have similar solubility properties which prevents preferential precipitation of one metal complex compared to the other.

According to the present invention it is also preferred that the molar ratio of zirconium to titanium on the catalyst be within the range of about 0.01:1 to 99:1, preferably between about 1:1 to 30:1, and more preferably about 16:1.

EXAMPLES

Examples provided are intended to assist in further understanding my invention. Particular materials, species, and conditions employed are intended to be further illustrative of my invention and not limitative of the reasonable scope thereof.

EXAMPLE I

This example describes the preparation of a single transition metal catalyst (a control catalyst). $Cp_2Ti(CH_3)_2$, 0.272 g (1.31 mmoles bis(cyclopentadienyl) dimethyl titanium) prepared according to published procedure J. Am. Chem. Soc. 95, 6261 (1973), Samuel, et al, in 90.2 g of n-hexane was mixed with 1.73 g (23.9 mmoles) of trimethyl aluminum (25 wt % solution in n-hexane). The mixture was hydrolyzed by bubbling wet nitrogen through the reaction vessel, 1.0 $ft^3$(0.51 g, 28.5 mmole) of water. The resultant red solid was filtered. The catalyst had 1.23 methyls per aluminum remaining and a ratio of Al to Ti of 18.2. The catalyst contained 3.76 wt % titanium.

EXAMPLE II

This example describes the preparation of a single transition metal catalyst (a control catalyst). $Cp_2Zr(CH_3)_2$, 0.3762 g (1.50 mmole bis(cyclopentadienyl) dimethyl zirconium) prepared according to published procedure J. Inorg. Nucl. Chem. 3, 104 (1956), Piper et al, and reacted with 2.18 (30.2 mmole) tri-methyl aluminum in n-hexane. The solution was hydrolyzed by bubbling wet nitrogen (1.065 $ft^3$, 0.56 g $H_2O$, 3.11 mmoles) through the hexane solution. The resultant white solid contained 1.55 methyls per aluminum and an Al to Zr ratio of 20. The catalyst was 5.36 wt % zirconium.

EXAMPLE III

This example describes the preparation of a catalyst according to the process of the present invention. To a 250 ml crown capped bottle were added 0.198 grams of $Cp_2Zr(CH_3)_2$ (0.78 mmole of bis(cyclopentadienyl) dimethyl zirconium) prepared as above and 0.84 grams of $Cp_2Ti(CH_3)_2$ (0.887 mmole bis(cyclopentadienyl) dimethyl titanium) prepared as above and dissolved in 12 mls of toluene. The solution was diluted to 100 mls with n-hexane and 1.69 g (23.4 mmole) trimethyl aluminum were added as a 25 weight percent solution in n-hexane from Alpha Corporation. 19.9 liters of nitrogen saturated with water (23° C., 0.422 g, 23.4 mmole of $H_2O$) was slowly bubbled through the solution with vigorous stirring. A precipitate gradually formed as the color changed from yellow to green and finally to a brick red. The solid was filtered in a dry box and washed with n-hexane. Analysis showed 1.14 methyl groups remaining on each aluminum.

EXAMPLE IV

In this example the preparation of a catalyst according to the process of the present invention is prepared. 3.47 g trimethyl aluminum (48.2 mmole 25 percent n-hexane from Alpha Corporation) in 100 ml of toluene was partially hydrolyzed by bubbling wet nitrogen (4.17 liters $N_2$, 23° C.; 0.868 g, 48.2 mmole $H_2O$) through the solution over a 2 hour period. The resulting colorless, viscous solution (I) contained 0.45 moles in aluminum with an average of 1.45 methyls per aluminum. To a 250 ml crown capped bottle was added 21.5 mls of solution (I) (9.69 mmole Al), and toluene solutions of 47.2 mg, $Cp_2Zr(CH_3)_2$ (0.188 mmole bis(cyclopentadienyl) dimethyl zirconium as above) and 26.0 mg $Cp_2Ti(CH_3)_2$ (0.125 mmole bis(cyclopentadienyl) dimethyl titanium as above). The yellow color of the $Cp_2Ti(CH_3)_2$ solution changed to a dark red. Hexane was added while the solution was stirred vigorously. A dark red solid precipitated and was filtered from the colorless filtrate.

EXAMPLE V

In this example the general process of preparation of polyolefins is illustrated. The polymerization reactions for each catalyst in Runs 1–18 were conducted by charging 50 mg of the catalyst into a two-liter stirred autoclave reactor using 1 liter of isobutane as a diluent. Ethylene and hydrogen were added to bring the total pressure to 3.8 MPA. Ethylene was added upon demand to maintain constant pressure. The temperature was maintained at 90° C. throughout the 60 minute reaction period. The ethylene and diluent were then vented and the polyethylene recovered as a granular solid. The polymer was stabilized with 0.05 weight percent each of Santonox R ® (antioxidant from Monsanto), DLTDP, and BHT and dried in a vacuum oven.

TABLES

All polymers in Runs 1–18 (Tables I–VI) were polymerized essentially in accordance with Example V. The concentrations of hydrogen, zirconium component, and titanium component are the only substantial variables and concentrations are indicated for each Run. In each Run the aluminum to metal molar ratio was about 20, unless otherwise indicated. The weight average molecular weight ($M_w$), number average molecular weight ($M_n$), and the HI were all determined by size exclusion chromatography (SEC). The HLMI values were determined by ASTM standard D1238 condition F. The MI values used in HLMI/MI were determined by ASTM standard D1238 condition D. The HLMI over MI is an indication of molecular weight distribution. The grams polymer per gram of catalyst per hour is represented by g pol/g cat/hr.

TABLE I

Polymerization Data for Catalysts Containing a Single Metal Component

| Run No. | $(Cp_2M(CH_3)_2)$* M= | Activity g pol/g cat/hr | Hydrogen (mole %) | HLMI |
|---|---|---|---|---|
| 1 | Zr | 4487 | 0 | 1.6 |
| 2 | Zr | 3793 | 4 | 141 |
| 3 | Ti | 180 | 0 | ** |
| 4 | Ti | 205 | 4 | ** |

*Zr catalyst prepared according to Example II; Ti catalyst prepared according to Example I.
**Too low to measure.

TABLE II

Molecular Weight Data For Polymers Prepared With Single Metal Component Catalysts

| Run No. | $(Cp_2M(CH_3)_2)$* M= | Hydrogen | $M_w$ | $M_n$ | HI |
|---|---|---|---|---|---|
| 5 | Zr | 0 | 206,000 | 65,500 | 31.5 |
| 6 | Zr | 2 | 7,000 | 1800 | 3.78 |
| 7 | Ti | 0 | 393,000 | 24,500 | 16.0 |
| 8 | Ti | 2 | 348,000 | 21,750 | 16.0 |

*Zr catalyst prepared according to Example II; Ti catalyst prepared according to Example I.

TABLE III

Polymerization Data For Catalysts Containing Both Zr and Ti Components

| Run No. | Zr/Ti Molar Ratio | Prep* Method | Activity g pol/g cat/hr | Hydrogen mole % | HLMI | HLMI/MI |
|---|---|---|---|---|---|---|
| 9 | 1 | III | 1300 | 0 | 0.4 | ** |
| 10 | 1 | III | 700 | 4 | 4.5 | 39 |
| 11 | 5 | III | 3000 | 0 | 0.4 | ** |
| 12 | 5 | III | 2350 | 4 | 96 | 50 |
| 13 | 16 | IV | 900 | 0 | 0.6 | ** |
| 14 | 16 | IV | 1350 | 4 | 215 | 53 |

*The catalysts were prepared according to the Example indicated (III or IV) with the Zr/Ti molar ratio as indicated. This aluminum to transition metal molar ratios are about 30 for Runs 9 and 10, 25 for Runs 11 and 12, and 10 for Runs 13 and 14.
**MI was too low to measure.

TABLE IV

Molecular Weight Data For Polymers Prepared With Catalysts Containing Both Zr and Ti

| Run No. | $M_n$ | $M_w$ | HI |
|---|---|---|---|
| 12(a) | 9400 | 108,000 | 11.5 |
| 14(b) | 6100 | 64,000 | 10.4 |

(a) Zr/Ti molar ratio equals 5 and aluminum to transition metal molar ratio equals 26.
(b) Zr/Ti molar ratio equals 16 and aluminum to transition metal molar ratio equals 10.

TABLE V

Polymerization Data For A Dual Metal Catalyst At Different Levels of Hydrogen In the Reactor*

| Run No. | Hydrogen (mole %) | Activity g pol/g cat/hr | MI | HLMI | HLMI/MI |
|---|---|---|---|---|---|
| 13 | 0 | 900 | ** | 0.6 | — |
| 15 | 2 | 1500 | .94 | 26.3 | 28 |
| 16 | 4 | 1400 | 1.85 | 61.0 | 33 |
| 17 | 6 | 1450 | 4.24 | 178 | 42 |
| 18 | 8 | 900 | 157 | *** | — |

*Zr/Ti molar ratio equals 16, prepared according to Example IV, and aluminum to transition metal molar ratio equals 10.
**MI too low to measure.
***HLMI too high to measure.

TABLE VI

Molecular Weight Data For Polymers Produced With A Dual Metal Catalyst at Different Hydrogen Concentrations*

| Run No. | Hydrogen (mole %) | $M_n$ | $M_w$ | HI |
|---|---|---|---|---|
| 13 | 0 | 60,000 | 261,000 | 4.4 |
| 15 | 2 | 11,600 | 102,000 | 8.8 |
| 16 | 4 | 8,000 | 79,000 | 9.8 |
| 17 | 6 | 7,200 | 67,000 | 9.3 |
| 18 | 8 | 4,200 | 32,000 | 7.6 |

*Zr/Ti molar ratio equals 16, prepared according to Example IV, and aluminum to transition metal molar ratio equals 10.

Results using catalysts containing only one metal component are described in Table 1. The zirconium catalyst is much more active than the titanium catalyst.

Catalyst productivities as high as 4500 gram polymer/gram total catalyst were obtainable with the Zr catalysts for a one hour run. The Ti catalysts were not as active and only produced about 200 grams polymer per gram catalyst per hour under the same conditions. A major difference between Ti and Zr catalysts is the response of the catalyst to hydrogen as a chain termination agent. The HLMI of polymer produced with the Zr catalyst goes from 1.6 when no hydrogen is added to the reactor to 141 when hydrogen constitutes 4 mole % of the reactants in the reactor. There is usually a slight reduction in catalyst activity when hydrogen is used in the reactor. The polymer produced with the Ti catalyst has a molecular weight too high for the HLMI to be measured. The addition of 4 mole % of hydrogen to the reactor does not change the molecular weight of the polymer enough to produce a measurable HLMI.

Figure 2:
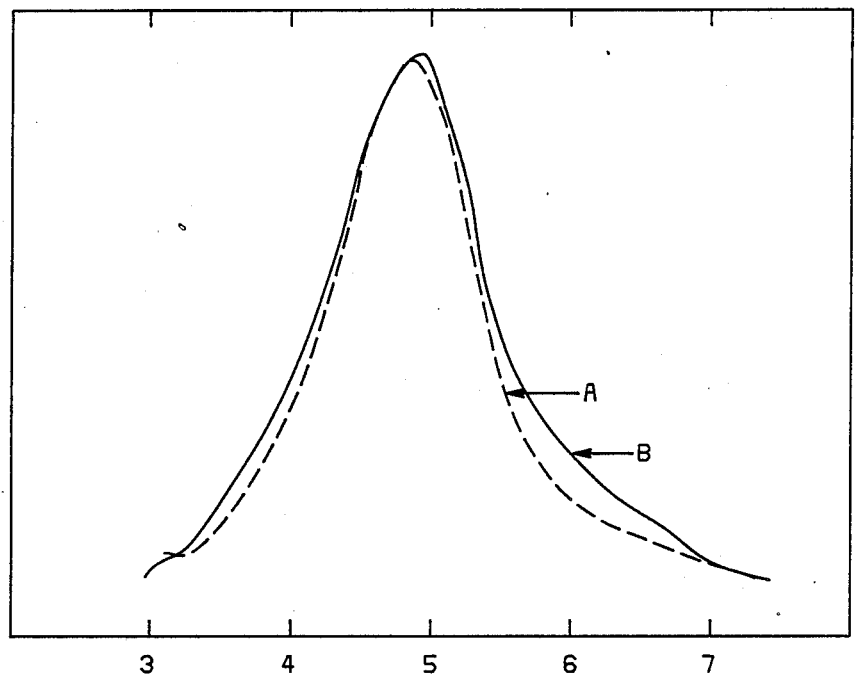

FIGS. 1 and 2 show the SEC curves of polymers prepared with Ti and Zr catalysts and the effects of adding hydrogen to the reactor. The change in molecular weight due to the chain transfer to the hydrogen is dramatic for Zr, but insignificant for the Ti catalyst. The weight average molecular weight ($M_w$) of the polymer produced with the Zr catalyst (FIG. 1) changes from 206,000 when no hydrogen is used to 6,840 when 4 mole % hydrogen is added to the reactor (Table II). The change in $M_w$ for the polymers produced without and with hydrogen using the Ti catalyst is much smaller, going from 393,000 to 348,000. The number average molecular weights ($M_n$) of the polymers follow the same patterns as the $M_w$s of the polymers so the molecular weight distributions, as measured by the heterogeneity index (HI), remain the same when hydrogen is added to the reactor. The HI of 16 for the Ti produced polymers makes it appear that the MWD of these polymers is very broad; however, these polymers have high molecular weight tails which strongly affect the $M_w$ but affect the $M_n$ to a much lesser degree so the HI value is misleading. The data in Table II show the $M_n$ of the polymer produced with the Ti catalyst without hydrogen is actually lower than that of the polymer produced under the same conditions with the Zr catalyst.

Figure 3:
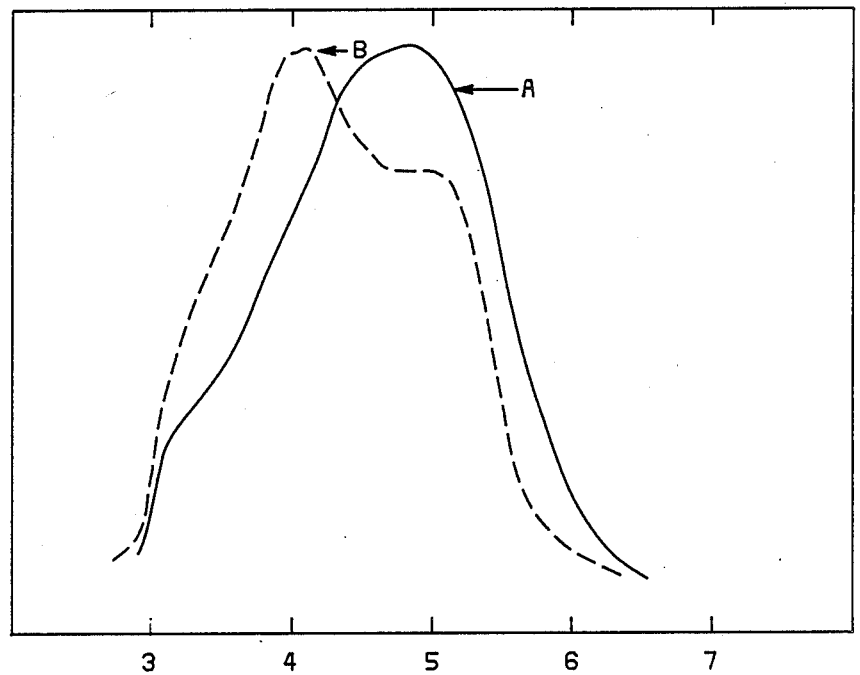
FIG. 3 shows the SEC curves of two polymers prepared under slurry phase polymerization conditions with two different zirconium/titanium aluminoxane catalysts with two different zirconium/titanium ratios in the presence of 4 mole percent hydrogen per 96 mole percent ethylene. The multiple peaks in each curve show that a polymer with a broad, multimodal molecular weight (MWD) is produced in the presence of hydrogen and the aluminoxane catalyst having two different metallocenes, each having different termination rate constants of olefin polymerization in the presence of hydrogen.
Figure 4:
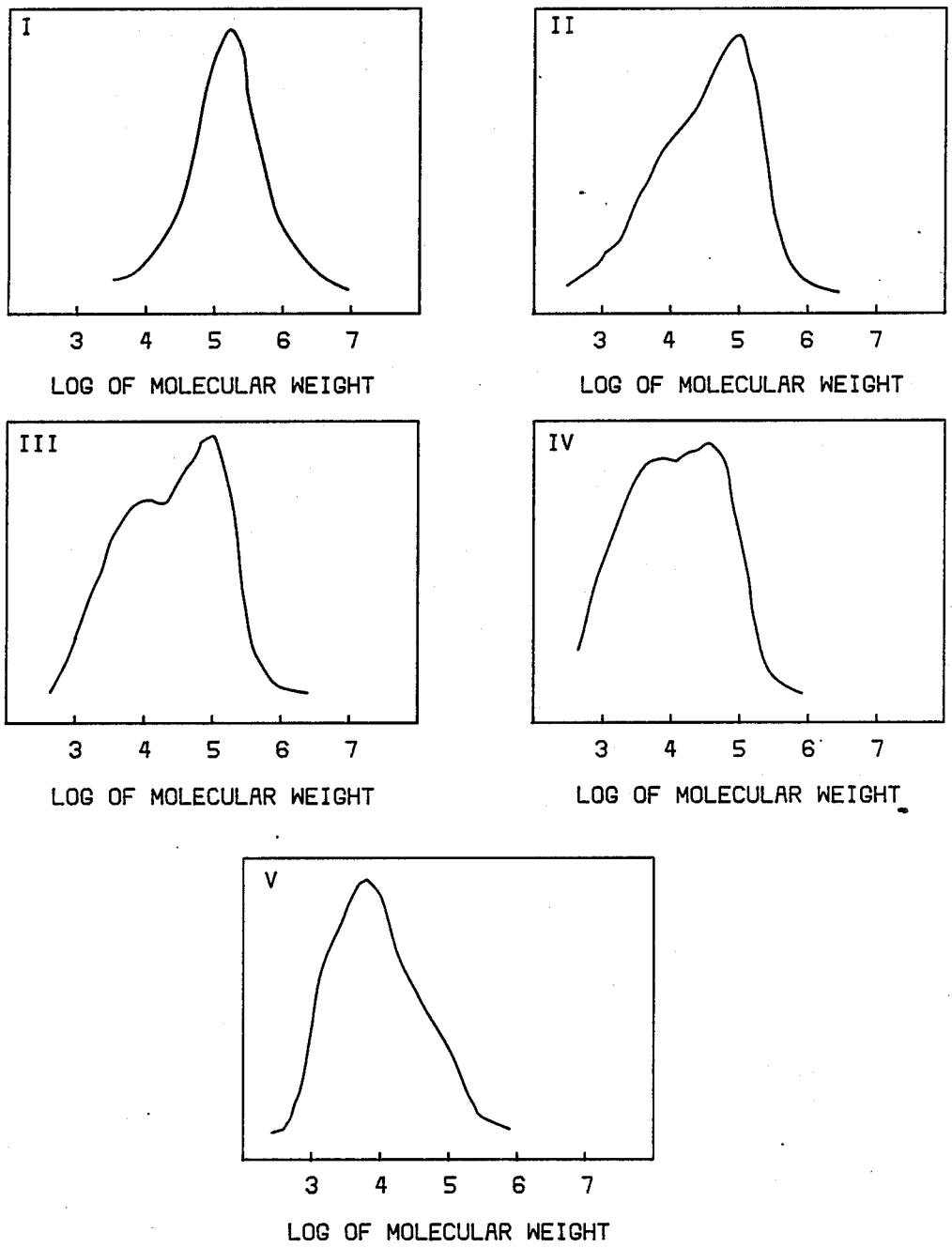
FIG. 4 shows the results of another method of broadening the bimodal MWD of polyethylene produced under slurry phase polymerization conditions with the dual metal catalysts.

Table III summarizes the polymerization results of some catalysts containing both the Ti and Zr components. The Zr to Ti ratio is varied from 1 to 16. The activities for these catalysts lie between those of the single metal component catalysts. The HLMI's of the polymers produced without hydrogen were essentially the same for all three Zr/Ti ratios. However, when hydrogen was added to the reactor, in each case, the HLMI went up. Comparing the three dual component catalysts at the same hydrogen concentration (4 mole %), the HLMI increase is larger at the higher Zr to Ti ratios. Size exclusion chromatography (SEC) data for Runs 12 and 14 are provided in Table IV and FIG. 3. Although the HI values for the two polymers are essentially the same, the $M_w$ of Run 14 (having Zr/Ti=16) is almost half that of the polymer produced under the same conditions with the catalyst having a Zr/Ti ratio of 5. The MWD of polymer 14 is obviously skewed to the low molecular weight end while that of polymer 12 is skewed to the high molecular weight end.

That which is claimed is:

1. A process for producing polyolefins having bimodal molecular weight distribution comprising:
   polymerizing under polymerization conditions in a polymerization zone at least one olefin in the presence of an amount of hydrogen and a heterogeneous catalyst system comprising:
   (a) an amount of at least two different metallocenes selected from mono, di, and tri-cyclopentadienyls and substituted cyclopentadienyls of a transition metal selected from the group consisting of Group IVB, VB, and VIB transition metals, each having different termination rate constants of olefin polymerization in the presence of hydrogen, and
   (b) an amount of an aluminoxane,
   wherein the initial amount of hydrogen, metallocenes, and aluminoxane in said polymerization zone is sufficient to produce a polyolefin having a bimodal molecular weight distribution.

2. The process according to claim 1 wherein the polymer produced is a high density polyethylene homopolymer having a density of at least about 0.95 determined according to ASTM standard 2839-69.

3. The process according to claim 1 wherein said polymerization conditions comprise slurry phase polymerization conditions.

4. The process according to claim 3 wherein said slurry phase polymerization conditions comprise a temperature of about 80° to 110° C., and a pressure of about 250 to 700 psia, for a time between about 1 minute to 6 hours.

5. The process according to claim 4 wherein said slurry phase polymerization conditions comprise a pressure of about 400 to 600 psia, for a time between about 10 minutes to 2 hours.

6. The process according to claim 5 wherein said slurry phase polymerization conditions comprise a pressure of about 500 to 565 psia, for a time between about 20 minutes to 1 hour.

7. The process according to claim 1 wherein said aluminoxane is methylaluminoxane.

8. The process according to claim 1 wherein said olefin is a mono-1-olefin selected from the group consisting of ethylene, propylene, and mixtures thereof, and said transition metals are titanium and zirconium.

9. The process according to claim 8 wherein the molar ratio of zirconium to titanium is within the range of about 0.01:1 to 99:1, the hydrogen concentration is within the range of about 0.001 to 15 mole percent, and the olefin concentration is within the range of about 99.999 to 85 mole percent.

10. The process according to claim 9 wherein the zirconium to titanium molar ratio is about 1:1 to 30:1, the amount of hydrogen introduced into the polymerization zone is about 1 to 10 mole percent, and the amount of olefin introduced into the polymerization zone is about 99 to 90 mole percent.

11. The process according to claim 10 wherein the zirconium titanium molar ratio is about 16:1, the amount of hydrogen introduced into the polymerization zone is about 4 mole percent and the amount of olefin introduced into the polymerization zone is about 96 mole percent.

12. The process according to claim 9 wherein the weight ratio of total metallocenes to aluminoxane is within the range of about 1:5 to 1:10$^8$.

13. The process according to claim 12 wherein the weight ratio of total metallocenes to aluminoxane is within the range of about 1:10 to 1:10$^5$.

14. The process according to claim 13, wherein the weight ratio a total metallocenes to aluminoxane is within the range of about 1:20 to 1:10$^3$.

15. The process according to claim 1 wherein said olefin is ethylene, said at least two different metallocenes are bis(cyclopentadienyl)zirconium dimethyl and bis(cyclopentadienyl)titanium dimethyl in a molar ratio between about 1:1 to 30:1 respectively, said aluminoxane is methylaluminoxane, said polymerization conditions comprise slurry phase polymerization conditions, said polyolefin is high density polyethylene, the hydrogen concentration is within the range of about 1 to 10 mole percent, and the olefin concentration is within the range of about 99 to 90 mole percent.

16. The process according to claim 15 wherein the diluent to catalyst system weight ratio is within the range of about 500:1 to 1,000,000:1.

17. The process according to claim 1 wherein said at least two different metallocenes are represented by the general formula $(C_5R'm)pR''s(C_5R'm)MeQ_{3-p}$ or $R''s(C_5R'm)_2MeQ'$ wherein $(C_5R'm)$ is cyclopentadienyl or substituted cyclopentadienyl, each R can be the same or different and is selected from hydrogen or a hydrocarbyl radical selected from alkyl, alkenyl, aryl, alkylaryl, or arylalkyl radicals having from 1 to 20 carbon atoms or two adjacent carbon atoms are joined together to form a $C_4$–$C_6$ ring, R'' is a $C_1$–$C_4$ alkylene radical, a dialkyl germanium or silicone or alkyl phosphine or amine radical bridging two $(C_5R'm)$ rings, Q is a hydrocarbon radical such as aryl, alkyl, alkenyl, alkylaryl, or arylalkyl radicals having from 1–20 carbon atoms or halogen and can be the same or different, Q' is an alkylidene radical having from 1 to about 20 carbon atoms, Me is a Group IVB, VB, or VIB metal, s is 0 or p is 0, 1 or 2, when p is 0, s is 0; m is 4 when s is 1 and m is 5 when s is 0.

18. The process according to claim 1 wherein said catalyst system is made according to the process comprising:
bubbling a wet inert gas through a hydrocarbon containing an amount of said at least two different metallocenes, and an amount of an aluminum compound of the formula $AlR_3$ wherein each R can be the same or different and is selected from alkyl groups having from 1 to 10 carbon atoms, thereby producing a dual metal on aluminoxane polymerization catalyst.

19. A process according to claim 1 wherein said catalyst system is halogen free.

20. A process according to claim 19 wherein said at least two different metallocenes are represented by the general formula $(C_5R'm)pR''s(C_5R'm)MeQ_{3-p}$ or $R''s(C_5R'm)_2MeQ'$ wherein $(C_5R'm)$ is cyclopentadienyl or substituted cyclopentadienyl, each R can be the same or different and is selected from hydrogen or a hydrocarbyl radical selected from alkyl, alkenyl, aryl, alkylaryl, or arylalkyl radicals having from 1 to 20 carbon atoms or two adjacent carbon atoms are joined together to form a $C_4$–$C_6$ ring, R' is a $C_1$–$C_4$ alkylene radical, a dialkyl germanium or silicone or alkyl phosphine or amine radical bridging two $(C_5R'm)$ rings, Q is a hydrocarbon radical such as aryl, alkyl, alkenyl, alkylaryl, or arylalkyl radicals having from 1–20 carbon atoms or halogen and can be the same or different, Q' is an alkyldiene radical having from 1 to about 20 carbon atoms, ME is a Group IVB, VB, or VIB metal, s is 0 or 1, p is 0, 1 or 2, when p is 0, si is 0; m is 4 when s is 1 and m is 5 when s is 0.

21. A process according to claim 1 wherein said polymerization zone contains a diluent selected from the group consisting of isobutane, n-hexane, n-heptane, methylcyclohexane, and mixtures of two or more thereof.

22. The process according to claim 21 wherein said olefin is ethylene, said at least two different metallocenes are bis(cyclopentadienyl)zirconium dimethyl and bis(cyclopentadienyl)titanium dimethyl in molar ratio between about 1:1 to 30:1 respectively, said aluminoxane is methylaluminoxane, said polymerization conditions comprise slurry phase polymerization conditions, said polyolefin is high density polyethylene, the hydrogen concentration is within the range of about 1 to 10 mole percent, and the olefin concentration is within the range of about 99 to 90 mole percent based on total hydrogen and olefin.

23. A process of altering the bimodal molecular weight distribution of a polyolefin comprising:
varying the initial amount of hydrogen present during the polymerization of an olefin in the presence of a heterogeneous catalyst system under polymerization conditions comprising
(a) at least two different metallocenes selected from mono, di, and tri-cyclopentadienyls and substituted cyclopentadienyls of a transition metal selected from the group consisting of Group IVB, VB, and VIB transition metals, each having different termination rate constants of olefin polymerization in the presence of hydrogen, and
(b) an aluminoxane
thereby producing a polyolefin having a varied bimodal molecular weight distribution.

24. A process according to claim 23 wherein said catalyst system is halogen free.

25. The process according to claim 24 wherein said olefin is ethylene, said at least two different metallocenes are bis(cyclopentadienyl)zirconium dimethyl and bis(cyclopentadienyl)titanium dimethyl in a molar ratio between about 1:1 to 30:1 respectively, said aluminoxane is methylaluminoxane, said polymerization conditions comprise slurry phase polymerization conditions, said polyolefin is high density polyethylene, the hydrogen concentration is within the range of about 1 to 10 mole percent, and the olefin concentration is within the range of about 99 to 90 mole percent olefin.

26. A process for producing polyolefins having bimodal molecular weight distribution comprising:
polymerizing under polymerization conditions at least one olefin in the presence of a heterogeneous catalyst system comprising
(a) at least two different metallocenes selected from mono, di, and tri-cyclopentadienyls and substituted cyclopentadienyls of a transition metal selected from the group consisting of Group IVB, VB, and VIB transition metals, each having different termination rate constants of olefin polymerizations in the presence of hydrogen and
(b) an aluminoxane,
wherein the improvement comprises the addition of hydrogen during the polymerization to alter the bimodalmolecular weight distribution of the resulting polymer.

27. A process according to claim 26 wherein said catalyst system is halogen free.

* * * * *